June 30, 1931.  E. W. ISOM  1,812,439
ART OF REFINING HYDROCARBONS
Filed Feb. 29, 1928
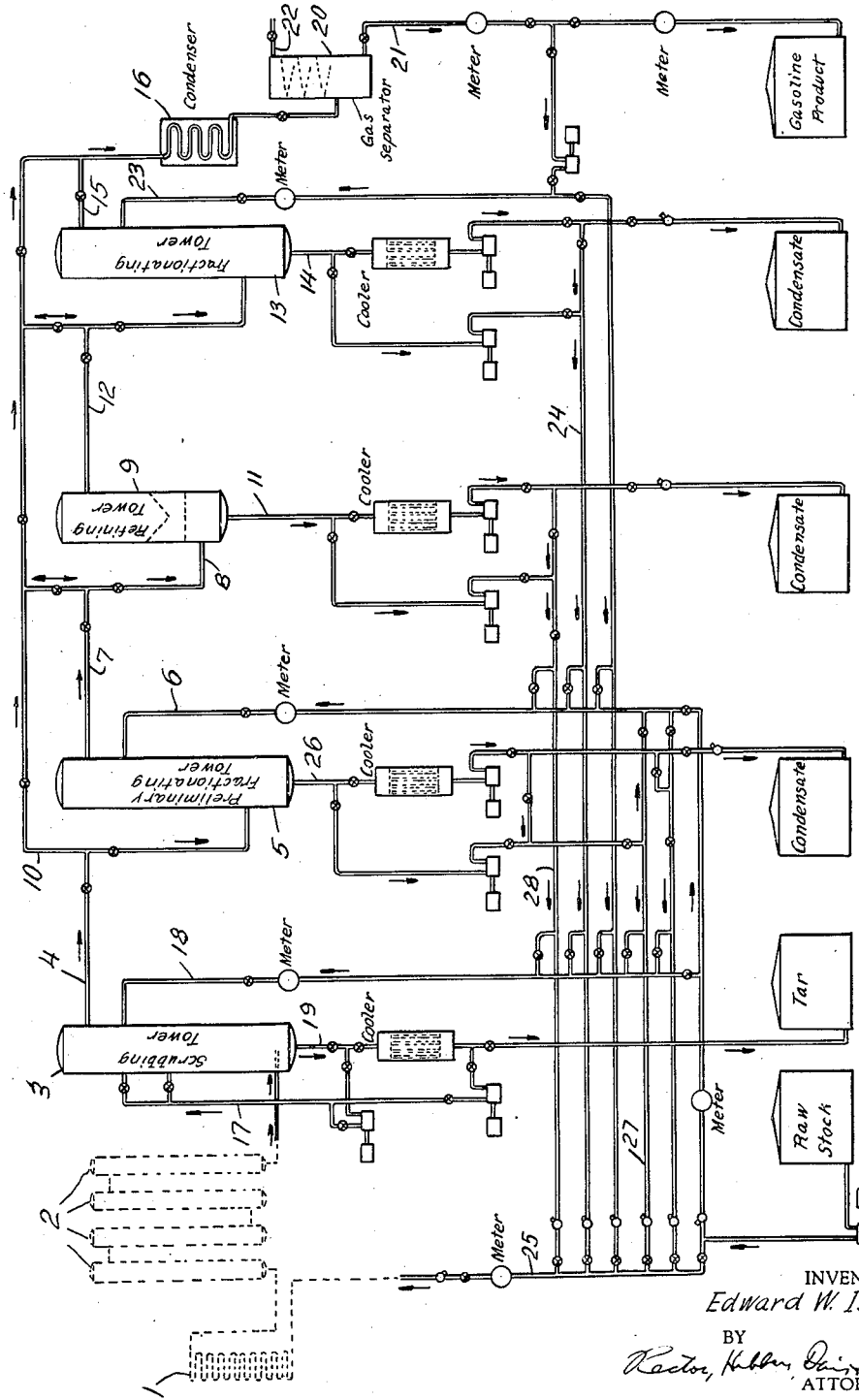
INVENTOR
Edward W. Isom
BY
ATTORNEYS Patented June 30, 1931

1,812,439

UNITED STATES PATENT OFFICE

EDWARD W. ISOM, OF SCARSDALE, NEW YORK, ASSIGNOR TO SINCLAIR REFINING COMPANY, OF NEW YORK, N. Y., A CORPORATION OF MAINE

ART OF REFINING HYDROCARBONS

Application filed February 29, 1928. Serial No. 257,959.

This invention relates to improvements in the refining of cracked gasoline, particularly gasoline produced by vapor phase cracking, intended for use as motor fuel.

Certain unsaturated constituents or aromatic constituents of cracked gasoline, particularly gasoline produced by vapor phase cracking, have anti-knock properties and therefore are of special value as components of motor fuel gasoline. However, cracked gasoline, particularly gasoline produced by vapor phase cracking, usually includes other unsaturated constituents, such as the di-olefines, which are undesirable as components of motor fuel gasoline because of instability, bad color or bad odor.

Such undesirable constituents can be selectively polymerized by passing vapors containing them through an adsorptive catalyst, such as fuller's earth, under appropriate conditions to form polymers of boiling point higher than the original constituents and such polymers can then be separated from the vapors, for example, by fractional condensation.

This general method of refining hydrocarbon vapors, by passing the vapors through an adsorptive catalyst, is well known, but its use in the refining of raw cracked gasoline involves several peculiar difficulties because cracked gasoline, particularly gasoline produced by vapor phase cracking, usually includes a relatively large proportion of highly reactive unsaturated constituents. All of these highly reactive constituents are not objectionable but many are of special value as components of motor fuel gasoline, as noted above.

When hydrocarbon vapors containing a large proportion of such reactive constituents are passed through such adsorptive catalysts, excessive polymerization and consequent loss of constituents desirable as components of the gasoline product is usually encountered. The polymerization reaction is exothermic and this, as well as the proportion of reactive constituents present, probably promotes this tendency toward excessive polymerization. Such losses are peculiarly important because they are losses of constituents of peculiar value as components of motor fuel gasoline.

A somewhat similar loss is also commonly encountered when hydrocarbon vapors containing a large proportion of such reactive constituents are subjected, in the raw state, to fractionating operations, for example, for the direct production of motor fuel gasoline of definite end boiling point. This loss also may be due to excessive polymerization, polymerization induced by the maintenance of the vapors at elevated temperature for a substantial period of time in the fractioning operation.

This invention provides a particularly advantageous method of refining the vapor of cracked gasoline, particularly gasoline produced by vapor phase cracking. The invention also provides a combined cracking and refining operation particularly advantageous for the production of motor fuel gasoline.

According to the present invention, the cracked gasoline vapors are passed through an adsorptive catalyst, such as fuller's earth, in admixture with a substantial proportion of vapors of higher boiling hydrocarbon constitutents and the vapor mixture escaping from the refining operation is then subjected to a fractionating operation to condense therefrom all constituents of boiling point higher than suitable as components of the desired gasoline product. The composition of the vapor mixture supplied to the refining operation should be such that condensed it forms a condensate containing not less than about 50% and not more than 75% of the desired gasoline product, or better not less than about 60% and not more than 70% of the desired gasoline product. The most advantageous gasoline concentration will vary, but for the production of motor fuel gasoline, of end boiling point approximately within the range of 390–440° F.; it comes within these limits.

In the combined cracking and refining operation of the invention, vapors including vapors of the gasoline product are taken off from the cracking operation proper, if necessary these vapors are subjected to a preliminary fractionating operation to bring the concentration of gasoline components in the remaining vapor mixture within the desired limits, the gasoline-containing vapors are then passed through a charge of an adsorptive catalyst such as fuller's earth, the vapors escaping from this refining operation are then subjected to a fractionating operation to condense all constituents of boiling point higher than suitable as components of the gasoline product, and the vapors escaping from this fractionating operation are condensed to form the gasoline product. A substantial proportion of the higher boiling polymers produced by the vapor-catalyst contact may be simultaneously separated in the refining operation proper and those remaining separated in the subsequent fractionating operation, or the preponderating proportion or substantially all of such polymers may be separated in the subsequent fractionating operation. The condensate produced in the fractionating operation following the refining operation proper is with advantage returned to the cracking operation proper. It may be returned directly to the cracking operation or reintroduced into some fractionating operation intermediate the cracking operation and the refining operation from which condensate is returned to the cracking operation to strip it of any low boiling constituents before the higher boiling portions are returned to the cracking operation.

While the invention is of special value and application in connection with vapor phase cracking operations, it is generally useful in connection with cracking operations of the several known types, but particularly where the vapor mixture from the cracking operation includes a relatively large proportion of highly reactive unsaturated constituents.

The invention makes possible an increase in the production of motor fuel gasoline of as much as 100% or more, particularly as compared to operations otherwise similar except in that the gasoline is frictionated directly to the end boiling point desired before being passed through the adsorptive catalyst and particularly where the condensates higher boiling than the gasoline product are returned to the cracking operation.

The invention is not predicated upon any explanation of the results obtained but upon the results themselves, but there are a number of factors which may contribute to the improved results which are obtained. Apparently, the dilution of the gasoline vapors during contact with the adsorptive catalyst tends to minimize excessive polymerization in the refining operation proper and in the subsequent fractionating operation, the more reactive constituents having been removed or rendered relatively inactive by polymerization, the reduced concentration of highly reactive constituents tends again to minimize objectionable polymerization. The presence of higher boiling constituents in the vapor mixture subjected to the refining operation proper tends to maintain a higher mean temperature in the refining operation; this higher temperature in conjunction with the dilution of the gasoline vapors may improve the refining operation itself, and this higher temperature may avoid losses due to separation of low boiling constituents with higher boiling polymers produced by the vapor-catalyst contact, particularly where such higher boiling material is returned to the cracking operation. The higher boiling constituents present in the vapor mixture may also act as a distilling medium stripping from the higher boiling polymers produced by the vapor-catalyst contact any dissolved or entrained low boiling constituents. Where the vapor mixture is fractionated to the final end boiling point before being passed in contact with the adsorptive catalyst some of the constituents polymerized in the refining operation of this invention may be condensed unpolymerized in the fractionating operation, and it is possible that such constituents in that form may have some high solvent capacity for low boiling constituents desirable as components of the gasoline product.

The invention will be further described in connection with the accompanying drawings which illustrate, diagrammatically and conventionally, one form of apparatus adapted for carrying out the invention. It will be understood that the exact form of the apparatus used is not essential to the invention The cracking apparatus illustrated, the heating coil 1, the digesting chambers 2 and the tar separating tower 3, are of the type described by Harry L. Pelzer for carrying out vapor phase cracking operations in an application filed June 13, 1927, Serial No. 198,621. The invention is of special value and application in connection with the operation of such vapor phase cracking apparatus.

As an example of the operation of this cracking apparatus, a gas oil fraction is supplied to the heating coil 1, the oil is vaporized therein and the vapors superheated to a temperature in the neighborhood of 1,000–1,500° F., these superheated vapors are passed through the digesting chambers 2 from which they are discharged at a temperature in the neighborhood of 900–1,000° F., the vapors discharged from the digesting chambers are freed of entrained tarry matter in the scrubbing tower 3, and the remaining vapors are then passed on to further fractionating and refining operations.

The separation of tarry matter in tower 3 is effected by scrubbing the vapors therein, for example, with fresh stock or with condensate from some subsequent fractionating operation supplied through connection 18, or by recirculating liquid tar through connection 17. Where fresh stock or a condensate suitable to be supplied to the heating coil 1 is used as a scrubbing agent, the rate at which it is supplied is regulated so that the stock, or so much of it as is free from tarry matter, is vaporized to escape to some subsequent fractionating operation from which condensate is returned to the heating coil 1. Where part of the separated tar is used as the scrubbing agent, the operation may be regulated by cooling or partially cooling this tar, or so much of it as is reintroduced into the tower, before reintroduction. The separated tar is discharged through connection 19. The raw cracked gasoline-containing vapors freed from tarry components escape through connection 4.

This vapor mixture is then passed through the fractionating or refluxing tower 5 where that portion of the higher boiling constituents necessary to bring the gasoline concentration in the vapor mixture within the limits previously mentioned is condensed. This operation may be controlled, for example, by the regulated introduction of fresh stock or of condensate from a subsequent fractionating operation through connection 6. The remaining vapor mixture escapes through connections 7 and 8 to the refining tower 9. If the concentration of gasoline components in the vapor mixture escaping from the cracking operation through connection 4 is within the desired limits, this vapor mixture may be supplied directly to the refining tower 9 through connections 10 and 8.

In the refining tower 9, the vapor mixture supplied through connection 8 is passed through a charge, for example, of fuller's earth of 40–60 or 60–80 mesh and those unsaturated constituents of the vapor mixture unsuitable as components of the gasoline product but falling within its boiling range are polymerized to form higher boiling polymers. A part of these higher boiling polymers may be separated from the vapor mixture in the refining tower and discharged therefrom through connection 11. The gasoline-containing vapors escape through connection 12 to the fractionating tower 13 where all constituents of the vapor mixture of boiling point higher than suitable as components of the gasoline product, including any remaining higher boiling polymers produced in the refining operation, are condensed. The condensate is discharged through connection 14. The remaining gasoline vapors escape through connection 15 to the condenser 16 where they are condensed to form the gasoline product. The gasoline condensate is separated from any uncondensed vapors and gases in the receiver 20. The condensed gasoline product is discharged from this receiver through connection 21 and uncondensed vapors and gases through connection 22. The fractionating operation carried out in tower 13 may be controlled, for example, by the reintroduction of part of the gasoline condensate through connection 23, or this operation may be controlled by the regulated introduction of a gasoline fraction from some other source as described in my application filed July 21, 1927, Serial No. 207,476.

The condensate separated from the gasoline-containing vapors in the fractionating tower 13 is with advantage returned to the cracking operation. This condensate, for example, may be returned directly to the heating coil 1 through connections 13, 24 and 25, or this condensate or part of it may be introduced into the scrubbing tower 3 through connections 14, 24 and 18 to control or assist in controlling the scrubbing operation therein, or this condensate or part of it may be introduced into the fractionating tower 5 through connections 14, 24 and 6 to control or assist in controlling the refluxing or fractionating operation therein. The condensate separated from the vapor mixture in the fractionating tower 5 is also with advantage returned to the cracking operation, either while hot or after cooling, through connections 26, 27 and 25. In such operation, the higher boiling portions of any condensate from tower 13 introduced into either tower 3 or tower 5 are returned to the cracking operation in admixture with the condensate from tower 5. The higher boiling polymers separated in the refining tower 9 and discharged through connection 11 may be handled in the same manner as the condensate discharged from tower 13. Where the major portion of the higher boiling polymers produced by the vapor-catalyst contact are separated in the refining tower 9, it is advantageous to introduce the material liquefied in this tower into the scrubbing tower 3, through connections 11, 28 and 18.

Raw stock to be supplied to the cracking operation may be supplied directly to the heating coil 1 through connection 25, or it may be introduced into the scrubbing tower 3 through connection 18 or into the fractionating tower 5 through connection 6, or it may be supplied to the operation in part in any two or more of these ways.

In carrying out the invention in the apparatus illustrated, the products of the vapor phase cracking operation which normally include a relatively large proportion of highly reactive unsaturated constituents, after the separation of tarry matter, are subjected to a fractionating operation in the tower 5 controlled to maintain the composition of the vapor mixture escaping from this tower to the refining tower 9 such that condensed it forms a condensate containing, for example, not less than about 60% and not more than 70% of the desired gasoline product, the remaining vapor mixture including vapors of the desired gasoline product diluted with higher boiling hydrocarbon constituents is then passed through fuller's earth or other similar adsorptive catalyst in the refining tower 9, the vapor mixture escaping from this refining operation is then subjected to a fractionating operation in tower 13 to condense all constituents of boiling point higher than suitable as components of the gasoline product, and the vapors escaping from this fractionating operation are condensed to form the gasoline product. In one sense, the refining operation includes the passage of the hydrocarbon vapors through the adsorptive catalyst and also the subsequent fractionating operation since a part at least of the higher boiling polymers produced by the vapor-catalyst contact are separated in the subsequent fractionating operation, but in carrying out the present invention higher boiling constituents other than those passed through the adsorptive catalyst as part of the gasoline-containing vapor mixture are also separated from the vapor mixture condensed to form the gasoline product in this fractionating operation. The condensate separated from the vapor mixture in this fractionating operation following the refining operation is, as described above, advantageously returned to the cracking operation proper.

I claim:

1. The improvement in refining cracked gasoline which comprises passing the gasoline in vapor phase but below the cracking temperature through an adsorptive catalyst in admixture with vapors of higher boiling hydrocarbons in proportions such that the vapor mixture when condensed forms a condensate containing not less than about 50% and not more than 75% of the gasoline product, condensing the constituents of the vapor mixture after passage through the adsorptive catalyst higher boiling than suitable as components of the gasoline product in a fractionating operation, and condensing the vapors escaping from this fractionating operation prior to further contacts with the adsorptive catalyst to form the gasoline product.

2. The improvement in refining cracked gasoline which comprises passing the gasoline in vapor phase but below the cracking temperature through an adsorptive catalyst in admixture with vapors of higher boiling hydrocarbons in proportions such that the vapor mixture when condensed forms a condensate containing not less than about 60% and not more than 70% of the gasoline product, condensing the constituents of the vapor mixture after passage through the adsorptive catalyst higher boiling than suitable as components of the gasoline product in a fractionating operation, and condensing the vapors escaping from this fractionating operation prior to further contact with the adsorptive catalyst to form the gasoline product.

3. An improved method of producing gasoline which comprises taking off from a cracking operation a vapor mixture including vapors of the gasoline product, bringing the concentration of gasoline components in this vapor mixture to a point such that condensed it forms a condensate containing not less than 50% and not more than 75% of the gasoline product, passing this gasoline-containing vapor mixture while at a temperature materially below the cracking temperature through an adsorptive catalyst, subjecting the vapor mixture remaining after passage through the adsorptive catalyst to a fractionating operation and therein condensing all constituents of boiling point higher than suitable as components of the gasoline product, and condensing the remaining vapors prior to further contact with the adsorptive catalyst to form the gasoline product.

4. An improved method of producing gasoline which comprises taking off from a cracking operation a vapor mixture including vapors of the gasoline product, bringing the concentration of gasoline components in this vapor mixture to a point such that condensed it forms a condensate containing not less than 50% and not more than 75% of the gasoline product, passing this gasoline-containing vapor mixture while at a temperature materially below the cracking temperature through an adsorptive catalyst, subjecting the vapor mixture remaining after passage through the adsorptive catalyst to a fractionating operation and therein condensing all constituents of boiling point higher than suitable as components of the gasoline product, returning condensate produced in this fractionating operation to the cracking operation, and condensing the vapors escaping from this fractionating operation prior to further contact with the adsorptive catalyst to form the gasoline product.

In testimony whereof, I have subscribed my name.

EDWARD W. ISOM.